US009189234B2

(12) United States Patent
Inoue (10) Patent No.: US 9,189,234 B2
(45) Date of Patent: Nov. 17, 2015

(54) REDUCING OVERHEAD IN LOADING CONSTANTS

(71) Applicant: International Business Machines Corporation, Armonk, NY (US)

(72) Inventor: Hiroshi Inoue, Tokyo (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/446,567

(22) Filed: Jul. 30, 2014

(65) Prior Publication Data

US 2015/0067300 A1    Mar. 5, 2015

(30) Foreign Application Priority Data

Sep. 4, 2013    (JP) ................................. 2013-182998

(51) Int. Cl.
*G06F 9/45*    (2006.01)
*G06F 9/30*    (2006.01)

(52) U.S. Cl.
CPC .............. *G06F 9/30101* (2013.01); *G06F 8/41* (2013.01); *G06F 8/443* (2013.01); *G06F 8/447* (2013.01); *G06F 9/3013* (2013.01); *G06F 9/30043* (2013.01); *G06F 9/30167* (2013.01)

(58) Field of Classification Search
CPC ........ G06F 8/41; G06F 8/447; G06F 9/30043
USPC ................................... 717/152, 153; 712/225
See application file for complete search history.

(56) References Cited

U.S. PATENT DOCUMENTS

| 6,052,773 | A * | 4/2000 | DeHon et al. .................... 712/43 |
| 6,367,071 | B1 * | 4/2002 | Cao et al. ........................ 717/160 |
| 7,278,137 | B1 * | 10/2007 | Fuhler et al. ................... 717/153 |
| 2005/0138340 | A1 * | 6/2005 | Lee et al. ....................... 712/228 |
| 2005/0283589 | A1 * | 12/2005 | Matsuo .......................... 712/217 |
| 2006/0095601 | A1 * | 5/2006 | Wang et al. ..................... 710/14 |
| 2008/0104375 | A1 * | 5/2008 | Hansen et al. ................. 712/220 |

FOREIGN PATENT DOCUMENTS

| JP | 11053187 A | 2/1999 |
| JP | 11096000 A | 4/1999 |
| JP | 2001067219 A | 3/2001 |

(Continued)

OTHER PUBLICATIONS

Zhang et al., "Compiler Optimizations to Reduce Security Overhead", 2006.*

(Continued)

*Primary Examiner* — Phillip H Nguyen
(74) *Attorney, Agent, or Firm* — Scully, Scott, Murphy & Presser, P.C.

(57) ABSTRACT

An overhead reduction system creates a plurality of candidates of constants to be stored in one or more constant registers based on constants used in the program code of the current compilation scope, estimates, for each of the candidates of constants, an effect of overhead reduction by generation of the constant used in the program code by using the candidate of constant, determines a base constant to be loaded on the constant registers based on the estimation result, loads the base constant on the constant registers at an entry point of the program code, and generates a code for generating the constants used in the program code by using values of the constant registers.

20 Claims, 8 Drawing Sheets

(56) References Cited

FOREIGN PATENT DOCUMENTS

| JP | 2001092633 A | 4/2001 |
| JP | 2001222426 A | 8/2001 |
| JP | 2003084973 A | 3/2003 |
| JP | 2004038586 A | 2/2004 |
| JP | 2004118470 A | 4/2004 |
| JP | 2004355477 A | 12/2004 |
| JP | 2012150634 A | 8/2012 |

OTHER PUBLICATIONS

D. Goodwin "Optimal and Near-Optimal Global Register Allocation", 1996.*

Japanese Application No. 2013-182998, Filed on Sep. 4, 2013, entitled: "Method, Apparatus, and Program for Reducing Overhead in Loading Constants".

* cited by examiner

REDUCING OVERHEAD IN LOADING CONSTANTS

CROSS-REFERENCE TO RELATED APPLICATIONS

The present application claims the benefit of priority of Japanese Patent Application Serial Number 2013-182998, filed on Sep. 4, 2013 with the Japanese Patent Office (JPO), the contents of which are herein incorporated by reference in its entirety.

BACKGROUND

The present invention generally relates to software development and more particularly to a technique for reducing constant loading overhead in a RISC processor.

Unlike CISC processors which may process instructions of variable lengths, RISC processors may require a fixed instruction size. As a result, a plurality of instructions may be necessary to load a long constant on a register in RISC processors. For example, in an IBM POWER™ processor, loading of a 32-bit constant 0x12345678 may be achieved by combining two instructions in the following fashion: (1) lis reg, 0x1234 and (2) on reg, reg, 0x5678.

Based on an instruction Us in item (1), a value shifting a constant 0x1234 by 16 bits to the left may be stored in a register reg. In this way, the digits of the upper half of the 32-bit constant 0x12345678 are set as upper 16 bits of the register reg. Next, based on an instruction on in item (2), a logical sum of the register reg and a constant 0x5678 may be written in the register reg. In doing so, the digits of the lower half of the 32-bit constant 0x12345678 may be set as lower 16 bits of the register reg. As a result, the 32-bit constant 0x12345678 may be loaded on the register reg.

As the number of instructions increases, execution time, cost, and pressure on an instruction cache may also increase. For example, loading of a 64-bit constant may require creating a memory region (also referred to as Table of Contents: TOC) with aligned constants during compilation. Then, one register (hereinafter "TOC register") may be allocated to hold a pointer indicating the TOC. To use a constant, the TOC register may load the constant from the memory. This may reduce the number of instructions for loading the constant but may substantially increase pressure on the data cache.

SUMMARY

Embodiments of the present invention disclose a method, computer program product, and system for reducing overhead in loading constants of a processor device including the steps of: (a) preparing, by the processor device, one or more registers (hereinafter, called "constant registers") for loading constants, (b) creating, by the processor device, a plurality of candidates of constants to be stored in the one or more constant registers based on constants used in a program code of a current compilation scope, (c) estimating, by the processor device, an effect of the overhead reduction by generation of a constant used in the program code by using a candidate of constant, for each of the plurality of candidates of constants, (d) determining, by the processor device, base constants to be loaded on the one or more constant registers based on the effect estimated for each of the plurality of candidates of constants, and (e) loading, by the processor device, for the program code, the base constants on the one or more constant registers at an entry point of the program code and using values of the constant registers to generate codes for generating constants used in the program code.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it may be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

In the following description, numerous specific details are set forth, such as particular structures, components, materials, dimensions, processing steps, and techniques, in order to provide a thorough understanding of the present invention. However, it will be appreciated by one of ordinary skill of the art that the invention may be practiced without these specific details. In other instances, well-known structures or processing steps have not been described in detail in order to avoid obscuring the invention. In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Figure 1:
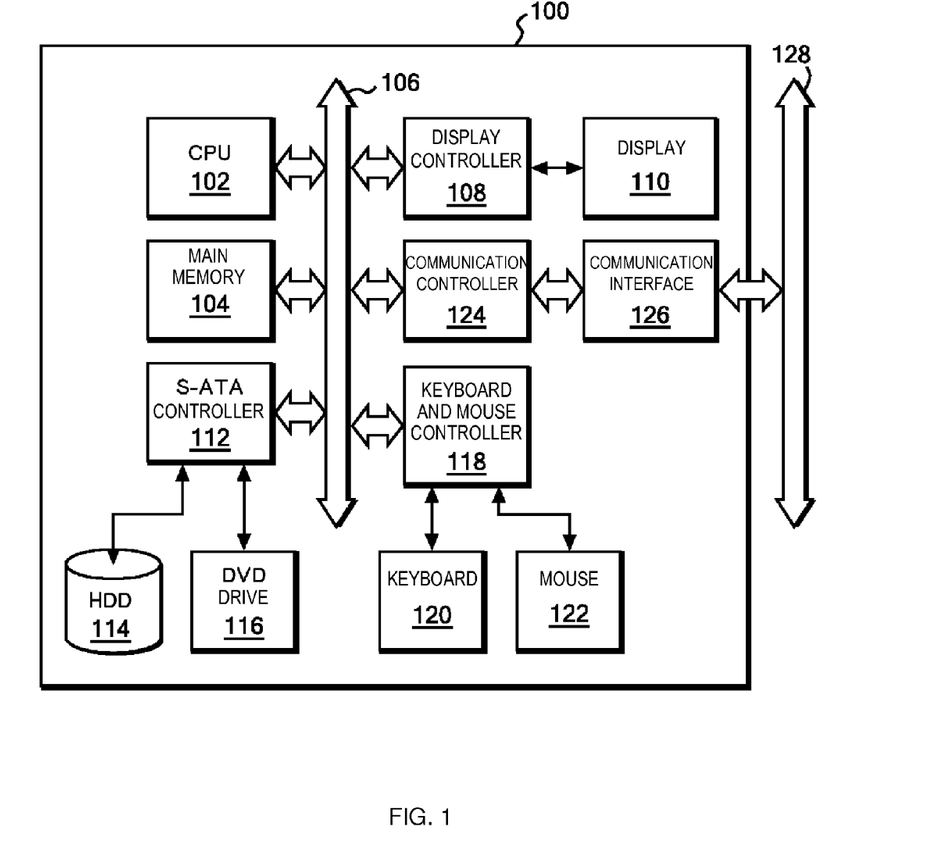
FIG. 1 shows an example of a hardware configuration suitable for achieving an overhead reduction system, according to an embodiment of the present disclosure.

Referring now to FIG. 1, an example of a hardware configuration for a processor device system 100 is shown, according to an embodiment of the present disclosure. The processor device system 100 may include a main central processing unit (CPU) 102 and a main memory 104 connected to a bus 106. The CPU 102 may preferably be based on a 32-bit or 64-bit architecture. In one embodiment, the CPU 102 may be, for example, a RISC processor such as an IBM POWER™ processor. In another embodiment, the CPU 102 may be, for example, a SPARC™ processor of Sun Microsystems, Inc. (currently, Oracle America, Inc.). The main memory 104 may preferably have a capacity of 1 GB or more, and more preferably, a capacity of 2 GB or more.

A display 110, such as a liquid crystal display (LCD), may be connected to the bus 106 through a display controller 108. The display 110 may, by means of a proper graphic interphase, display information of a processor device connected to a network through a communication line and may show information of a software operating on the processor device in order to manage said processor device.

A disk 114 may also be connected to the bus 106 through a SATA (or IDE) controller 112. In one embodiment, the disk 114 may include a silicon disk. In another embodiment, the disk 114 may include a hard disk. Furthermore, a drive 116 may be arbitrarily connected to the bus 106 through the SATA (or IDE) controller 112. The drive 116 may include, for example, a CD, DVD, or BD drive. Alternatively, in some embodiments, a keyboard 120 and a mouse 122 may be connected to the bus 106 through a keyboard and mouse controller 118 or a USB bus (not shown).

An operating system, such as an IBM AIX™ or a Solaris™ provided by Sun Microsystems, Inc. (currently, Oracle America, Inc.), may be stored in the disk 114. The operating system may be loaded to the main memory 104.

A processor device program for providing an instruction to the CPU 102 in cooperation with the operating system may be further recorded in the disk 114. More specifically, a program for overhead reduction in loading constants may be installed in the processor device system 100. According to an embodiment of the present disclosure, installation of the program for overhead reduction may cause the processor device system 100 to function as an apparatus/system for overhead reduction in loading constants. It should be noted that related data may be recorded in the disk 114.

The program for overhead reduction in loading constants may include a register allocation module, a constant candidate creation module, an estimation module, a base constant determination module, and a code generation module. These modules may operate on the CPU 102 causing the processor device system 100 to function as a register allocation unit 202, a constant candidate creation unit 204, an estimation unit 206, a base constant determination unit 208, and a code generation unit 210 as will be described in FIG. 2. It should be noted that the present disclosure may be dynamically or statically implemented as part of the functions of a compiler.

The processor device program may be compressed or divided into a plurality of programs and recorded in a plurality of media. The drive 116 may be used to install the program on the disk 114 from a CD-ROM, DVD-ROM, or BD if required.

A communication interface 126 may follow, for example, an Ethernet protocol. The communication interface 126 may be connected to the bus 106 through a communication controller 124. The communication interface 126 may physically connect the processor device system 100 to a communication line 128. As a result, the communication interface 126 may provide a network interface layer to a TCP/IP communication protocol of a communication function of the operating system of the processor device system 100. It should be noted that the communication line may be based on a wired LAN environment or on a wireless LAN environment, such as a Wi-Fi standard of IEEE 802.11a/b/g/n or the like.

It may be understood by someone skilled in the art that the processor device system 100 may be achieved by any information processing apparatus such as, for example, a personal processor device, a work station, a mainframe, or a combination thereof.

Figure 2:
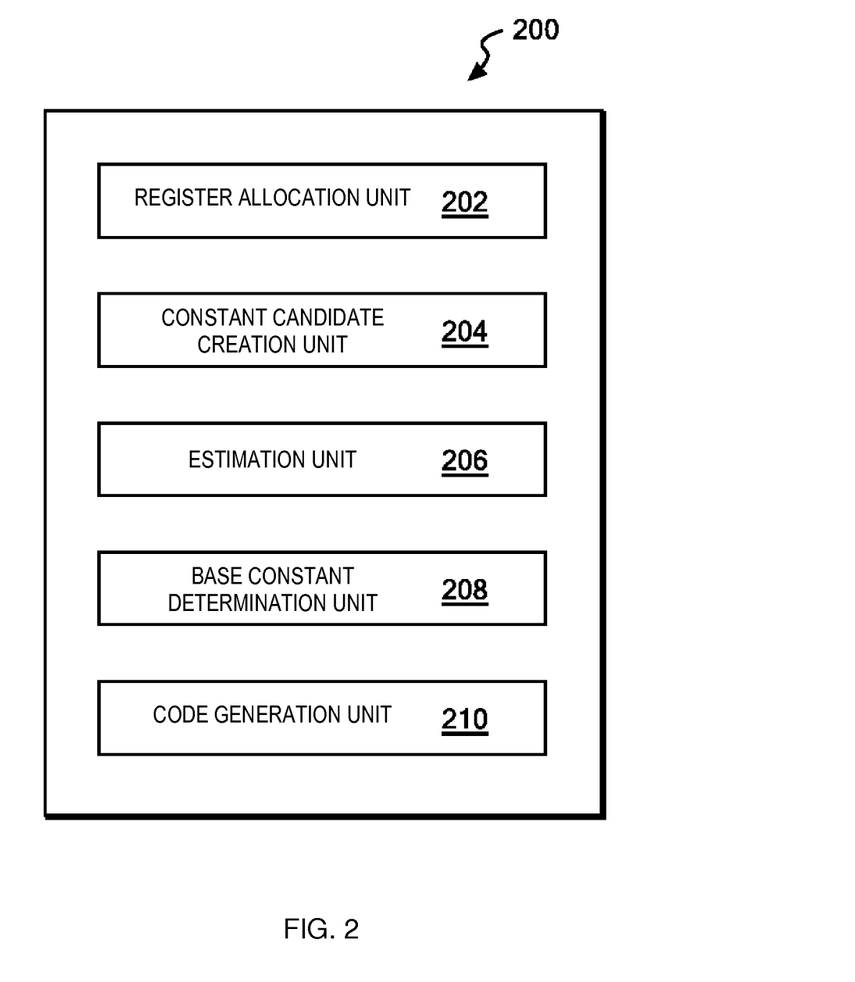
FIG. 2 is a functional block diagram of the overhead reduction system, according to an embodiment of the present disclosure.

Referring now to FIG. 2, a functional block diagram of a system 200 (hereinafter "overhead reduction system") for overhead reduction in loading constants is shown, according to an embodiment of the present disclosure. The overhead reduction system 200 may include a register allocation unit 202, a base constant determination unit 208, and a code generation unit 210. The register allocation unit 202 may allocate one or a plurality of registers specifically for loading constants. The base constant determination unit 208 may determine values (hereinafter "base constants") that minimize the number of instructions for generating constants used in the program code. The code generation unit 210 may generate codes for loading the values determined as base constants on registers dedicated to loading constants at the top of the program code. The overhead reduction system 200 may further include: a constant candidate creation unit 204 that may create constants to be loaded on the registers dedicated to loading constants, and the estimation unit 206 that may estimate, for each candidate, a consequence of reducing the number of instructions by generation of constants using the candidates. The base constant determination unit 208 may determine base constants by referring to the results of the estimation unit 206, and from the candidates of constants created by the constant candidate creation unit 204. Hereinafter, functions of the constituent elements will be described in detail.

The register allocation unit 202 may allocate one or more registers as registers dedicated to loading constants, that is, constant registers. Although this may reduce the number of registers that may be used for other applications, the number of registers in the RISC processor may not be deficient. Additionally, for a compilation scope (for example, a method) in which the number of registers may become insufficient, the constants may be loaded by typical or known methods.

The constant candidate creation unit 204 may create a plurality of candidates of constants to be stored in one or more constant registers based on the constants used in the program code of the compilation scope. Preferably, the constant candidate creation unit 204 may create a new plurality of candidates of constants based on the constants used in the program code. More specifically, the constant candidate creation unit 204 may create, as a plurality of candidates of constants, the constants used in the program code, first values, second values, and third values. The first values and second values may be obtained by adding predetermined values $V_1$ and $V_2$ ($V_2 > V_1$) to the constants. The third values may be obtained by setting lower n bits of the constants with the first values and the second values set to 0. It should be noted that n is a positive integer.

In a system in which the instruction length may be 32 bits, the least number of instructions for generating instructions in the program code by using the candidates of constants is one, and the values of $V_1$, $V_2$, and n may be −0x7FFF, 0x8000, and 16, respectively. More specifically, during compilation, the constant candidate creation unit 204 may create, as candidates of constants, new values obtained by adding −0x7FFF and 0x8000 to the constants and new values obtained by setting the lower 16 bits of the constants as well as the values after the addition to 0, in addition to the constants used in the method. By including, as candidates of constants, the values obtained by adding −0x7FFF and 0x8000 (maximum range of constants that may allow addition and subtraction by one instruction in the system) to the constants used in the method and the values obtained by setting the lower 16 bits of the candidates of constants to 0, a large effect may be obtained compared to when the constants used in the method are directly selected.

For example, assuming that the constants used in the method are 0x12341234 and 0x12350000. Although 0x12341234 may not be generated from 0x12350000 by one instruction, if a value 0x12349234 obtained by adding 0x8000 to 0x12341234 is set as the base constant stored in the constant register, constants 0x12341234 (=0x12349234−0x8000) and 0x12350000 (=0x12349234+6DCC) may be both generated from the base constant by one instruction. In this way, by including as candidates not only the constants used in the method, but also the newly created constants based on the constants used in the method, the possibility of storing in the constant registers constants with high reuse factors may be increased which may be effective in reducing overhead in loading constants.

Furthermore, the constant candidate creation unit 204 may remove constants that may be generated by the least number of instructions from the candidates of constants. For example, in a system in which the instruction length may be 32 bits, 16-bit constants may be removed from the candidates of constants because the 16-bit constants may be expressed by the least number of instructions, that is, one instruction. However, for constants used at a significantly high frequency (for example, values 1, −1, and the like may be frequently used), the number of instructions may be reduced by holding the constants in the constant registers even if the constants may be generated by one instruction. Therefore, preferably, the constant candidate creation unit 204 may remove constants that may be generated by the least number of instructions and that may not be frequently used from the plurality of candidates of constants.

The constant candidate creation unit 204 may preferably include a value 0 in the plurality of candidates of constants when removing the constants that may be generated by the least number of instructions from the candidates of constants. In a general RISC instruction set, GPR0 as a general-purpose register (GPR) may not be content of the register in a large number of instructions and may be handled as a constant 0. However, for a store instruction, GPR0 may not be handled as a constant, and 0 needs to be generated for one GPR every time a value 0 is stored. Therefore, if 0 is frequently stored, the number of instructions may be reduced by holding the value 0 in the constant register. Thus, preferably, the constant candidate creation unit 204 may include the value 0 in the plurality of candidates of constants.

For each of the plurality of candidates of constants, the estimation unit 206 may estimate an effect of overhead reduction by generation of a constant used in the program code by using a candidate of constant. Specifically, for each constant used in the program code, the estimation unit 206 may count the number of uses in the program code and may utilize the counted number of uses to calculate, for each candidate of constant, the number of instructions that may be reduced by generation of the constant used in the program code by using the candidate of constant. In this case, the number of instruction may serve as a score indicating the effect of the overhead reduction.

The score of each candidate of constant is initialized to 0 and is then calculated by adding values of 1. and 2. and subtracting a value of 3. from the value. The values 1., 2., and 3. are further described below.

According to an embodiment of the present disclosure, a value 1. may represent a total value of the values obtained by multiplying the numbers of uses of the constants employed in the program code that may be generated by the least number of instructions by using the candidates of constants as targets of score calculation (hereinafter "target candidates") by the numbers of instructions that may be reduced by using the target candidates. This may occur because every time a constant generated by the least number of instructions using the target candidates is used, a predetermined number of instructions may be reduced compared to when the constant is generated from scratch. In a system in which the instruction length is 32 bits, the predetermined number of instructions that may be reduced to generate a 32-bit constant is one. It should be noted that whether a constant may be generated by the least number of instructions by using the target candidates may be determined by whether the constant corresponds to one of the cases described below. If the constant corresponds to one of the cases, it is determined that the constant may be generated by the least number of instructions by using the target candidates.

For example, case 1., the constant and upper n bits of the target candidate match. Case 2., the difference between the constant and the target candidate may be a value between the predetermined value $V_1$ and the predetermined value $V_2$. Case 3., lower n bits of the difference between the constant and the target candidate may be a value 0. It should be noted that in a system in which the instruction length is 32 bits, the values of $V_1$, $V_2$, and n may be −0x7FFF, 0x8000, and 16, respectively.

According to an embodiment of the present disclosure, a value 2. may represent a value obtained by multiplying the number of uses of the target candidate in the program code by the number of instructions necessary to generate the target candidate from scratch. This is because the target candidate is already held in the constant register, and the target candidate does not have to be generated. Every time the target candidate is used, the number of instructions necessary to generate the target candidate from scratch may be reduced. In a system with a 32-bit instruction length, two instructions may be necessary to generate a 32-bit constant from scratch, and the value of 2. may be obtained by doubling the number of uses of the target candidate.

According to an embodiment of the present disclosure, a value 3. may represent the number of instructions necessary to generate the target candidate. This is because the number of instructions necessary to load the target candidate on the constant register at the method entry point is deducted. In a system with a 32-bit instruction length, the number of instructions is a value 1 if the lower 16 bits of the target candidate is 0, and the number of instructions is a value 2 if the lower 16 bits of the target candidate is not 0.

It should be noted that the number of uses of each constant including the candidate of constant in the program code may be a static number of uses indicating the number of points in which the constant may be used in the program code. Alternatively, the number of uses of each constant may be the number of times that the constant is loaded during the execution of the code, that is, a dynamic number of uses obtained by multiplying the static number of uses by an execution frequency. The implementation of the static number of uses may be effective in reducing the code size. Meanwhile, the implementation of the dynamic number of uses may be effective in reducing the number of execution instructions.

The base constant determination unit 208 may determine base constants to be loaded on one or more constant registers from the plurality of candidates of constants based on the effects of the estimation of the plurality of candidates of constants by the estimation unit 206. More specifically, on the condition that the scores indicating the effects of the estimation by the estimation unit 206 exceed a predetermined threshold, the base constant determination unit 208 may extract a plurality of candidates of constants in descending order of the scores by an amount equal to the number of constant registers and may determine the candidates as the base constants. In one embodiment, the predetermined threshold may be, for example, 0. This is because if the score exceeds 0, it is estimated that the performance may be improved by loading the candidates of constants with this score on the constant registers. In another embodiment, a small positive number may be used as the predetermined threshold to prevent degradation of the performance caused by vagueness of the estimation.

For the program code, the code generation unit 210 may load the base constants on one or more constant registers at the entry point of the compilation scope and may use the values of the constant registers to generate codes for creating the constants used in the program code of the compilation scope. It should be noted that the code generation unit 210 may be configured to execute the rest of the compilation process for the program code and output compiled codes to the entire program code. It should also be noted that the compilation process is a known technique and is not a main point of the present disclosure. Therefore, the compilation process will not be described.

Next, a flow of a process for overhead reduction in loading constants will be described with reference to FIGS. 3, 4, 5A, and 5B. As described above, the process for overhead reduction in loading constants may be executed as part of a process by the compiler and may preferably be executed after an optimization process by the compiler is completed.

Figure 3:
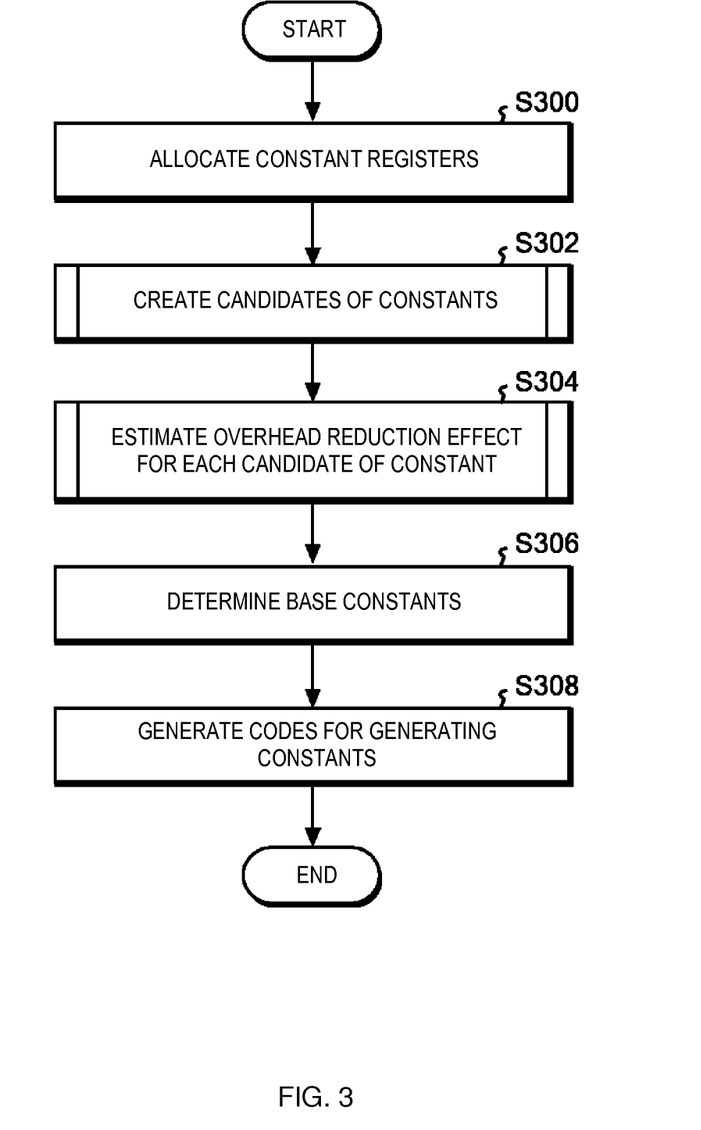
FIG. 3 is a flow chart showing an example of an overhead reduction process, according to an embodiment of the present disclosure.

Referring now to FIG. 3, a flow chart describing an example of a process flow for overhead reduction in loading constants is shown, according to an embodiment of the present disclosure. The process for overhead reduction in loading constants may start in step 300. In this step, the system 200 (FIG. 2) may allocate one or more constant registers. Subsequently, the system 200 (FIG. 2) may create a plurality of candidates of constants to be stored in one or more constant registers based on the constants used in the program code of the compilation scope (step 302). Subsequently, for each of the plurality of candidates of constants, the system 200 (FIG. 2) may estimate the effect of overhead reduction by the generation of the constant used in the program code when using the candidate of constant (step 304).

Then, the system 200 (FIG. 2) may determine candidates of constants to be loaded on the constant registers from the plurality of candidates of constants based on the estimated results (step 306). It should be noted that if it is determined that the effect is not so high as a result of the estimation, the use of the constant register may be stopped. More specifically, on the condition that the estimated effects exceed the predetermined threshold, the system 200 (FIG. 2) may extract the candidates of constants in descending order of the effects by an amount equal to the number of constant registers and determine the candidates as the base constants. Subsequently, for the program code, the system 200 (FIG. 2) may load the base constants on one or more constant registers at the entry point of the compilation scope and may use the values of the constant registers to generate codes for generating the constants used in the compilation scope (step 308). Then, the process may end.

It should be noted that the target of the creation process of candidates of constants in step 302 and the estimation process of overhead reduction effect in step 304 is the program code of the compilation scope. However, if the compilation scope is a method where a first method invokes a second method, the effect may be estimated by executing these steps by setting a region combining the first method and the second method as the target of processing. If the estimated effect is higher than the sum of the effects estimated by setting the regions of the first method and the second method as independent processing targets, the base constant may be determined based on the effect obtained when the region combining the first method and the second method is set as the processing target. In this case, the base constant loaded on the constant register at the entry point of the first method may not be changed at the entry point of the second method.

Figure 4:
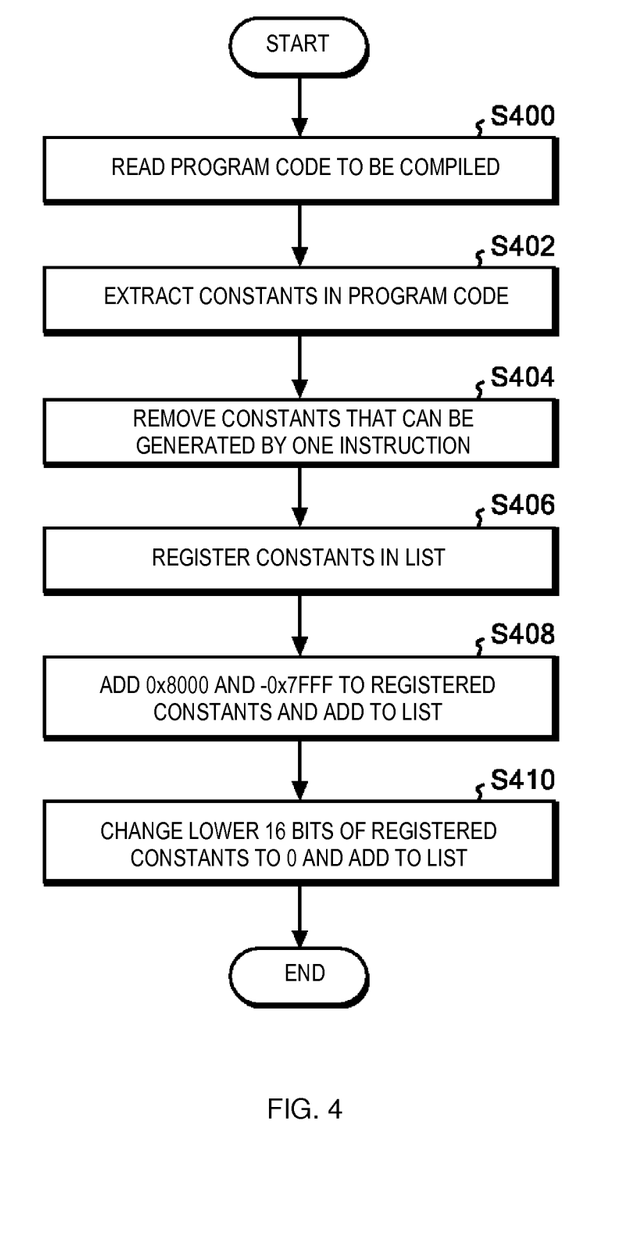
FIG. 4 is a flow chart showing an example of a candidate creation process of constants to be loaded on constant registers, according to an embodiment of the present disclosure.

Referring now to FIG. 4, a flow chart describing an example of a process flow for creating candidates of constants to be loaded on constant registers is shown, according to an embodiment of the present disclosure. The process of creating the constant candidates may start in step 400. In this step, the system 200 (FIG. 2) may read the program code to be compiled. Subsequently, the system 200 (FIG. 2) may extract all the constants from the read program code (step 402). Next, the system 200 (FIG. 2) may remove the constants that may be generated by one instruction, that is, 16-bits constants, from the extracted one or more constants (step 404). However, as described above, frequently used constants may be left even if the constants are generated by one instruction.

Subsequently, the system 200 (FIG. 2) may register the remaining constants that are not removed in a list of candidates of constants (step 406). Then, the system may add 0x8000 and −0x7FFF to the constants registered in the list of candidates of constants and may add the added values to the list of candidates of constants (step 408). The system 200 (FIG. 2) may change the lower 16 bits of the constants registered in the list of candidates of constants to 0 and may add the changed values to the list of candidates of constants (step 410). At this point, the process may end.

Figure 5A:
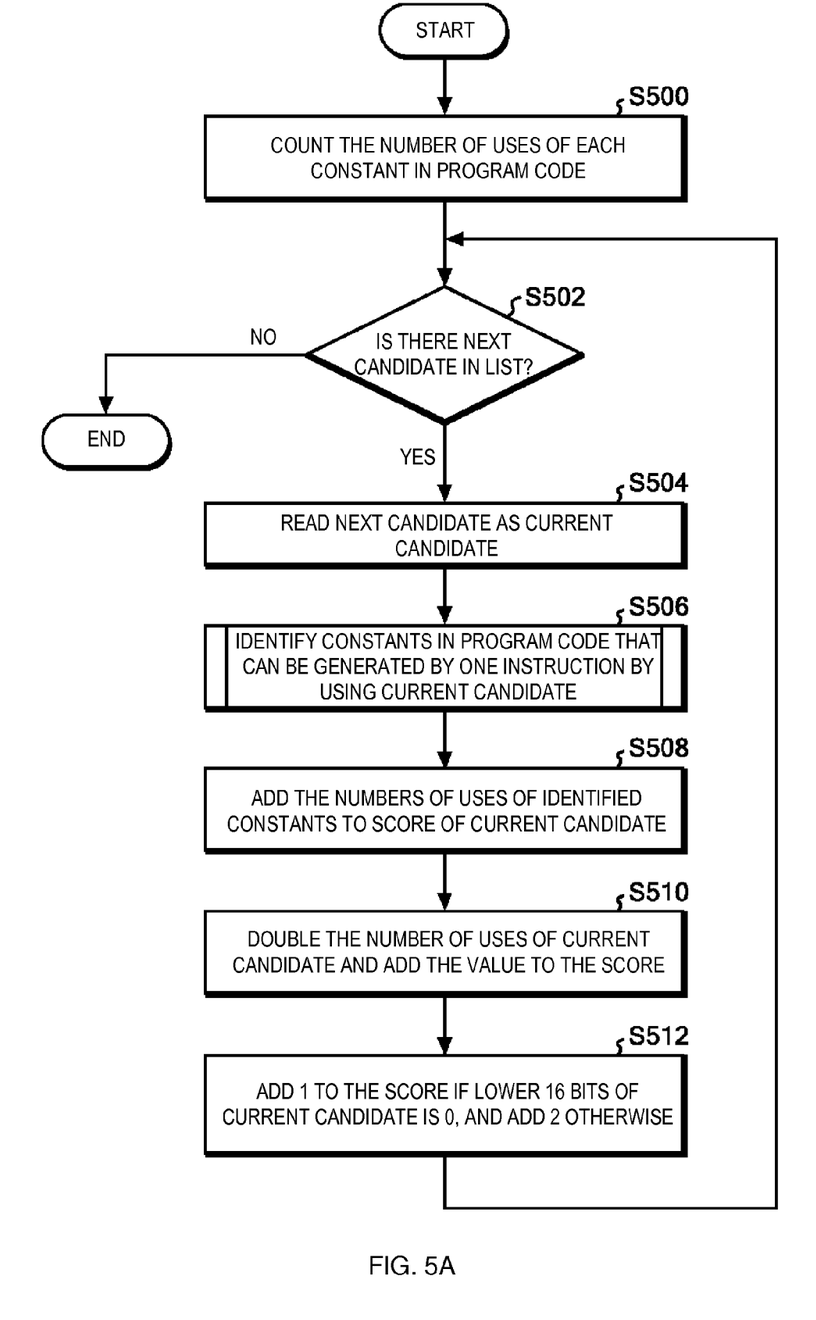
FIG. 5A is a flow chart showing an example of an estimation process of an overhead reduction effect in loading constants, according to an embodiment of the present disclosure.

Referring now to FIG. 5A, a flow chart describing an example of an estimation process of the overhead reduction effect in loading constants is shown, according to an embodiment of the present disclosure. The estimation process may start in step 500. In this step, the system 200 (FIG. 2) may count the number of uses of each constant in the program code. As described above, the counted number of uses may be a static number indicating the number of points corresponding to the constant being used in the program code. Alternatively, the counted number of uses may be a dynamic number indicating that the constant may be loaded during the execution of the code. In the latter case, the dynamic number of uses may be acquired by using profile information collected during the execution of the program.

Subsequently, the system 200 (FIG. 2) may determine whether there are candidates of constants in the list of candidates of constants not yet subjected to the estimation process (step 502). If there are unprocessed candidates of constants (step 502: YES), the system 200 (FIG. 2) may extract one unprocessed candidate of constant and set the candidate as the current candidate of constant (step 504). In this case, the system 200 may initialize the score of the current candidate of constant to 0. Subsequently, the system 200 may use the current candidate of constant to identify the constants in the program code that may be generated by one instruction (step 506).

Then, the system 200 (FIG. 2) may add the numbers of uses of all constants identified in step 506 to the score of the current candidate of constant (step 508). Furthermore, the system 200 (FIG. 2) may double the number of uses of the current candidate of constant in the program code and add the value to the score of the current candidate of constant (step 510). Furthermore, the system 200 (FIG. 2) may subtract 1 from the score if the lower 16 bits of the current candidate of constant are 0 and may subtract 2 from the score if the lower 16 bits of the current candidate of constant are not 0 (step 512). After step 512, the system 200 (FIG. 2) may return the process to step 502 and repeat the series of processes until it may be determined that there is no unprocessed constant in the list of candidates of constants in step 502 (step 502: NO).

Figure 5B:
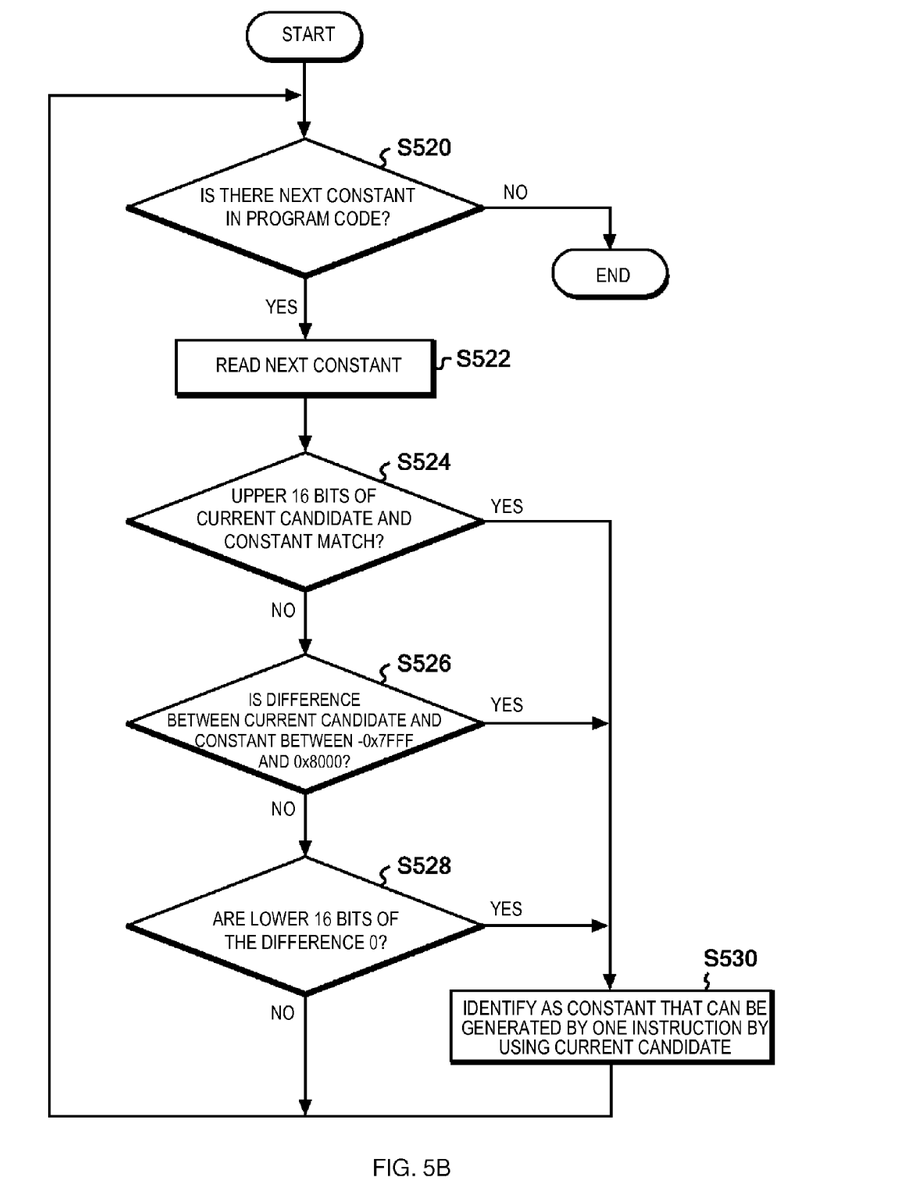
FIG. 5B is a flow chart showing an example of an identification process of constants that may be generated by one instruction by using candidates of constants, according to an embodiment of the present disclosure.

Referring now to FIG. 5B, a flow chart describing an example of an identification process of constants generated by one instruction by using the candidates of constant is shown, according to an embodiment of the present disclosure. The identification process may start in step 520. In this step the system 200 (FIG. 2) may determine if there are unexamined constants in the program code. If there are unexamined constants (step 520: YES), the system 200 (FIG. 2) may read one unexamined constant (step 522). Subsequently, the system 200 (FIG. 2) may determine whether the upper 16 bits of the current candidate of constant and the read constant match (step 524). If they do not match (step 524: NO), then the system 200 (FIG. 2) may determine whether the difference between the current candidate of constant and the read constant is between −0x7FFF and 0x8000 (step 526). If the difference is not between −0x7FFF and 0x8000 (step 526: NO), then the system 200 (FIG. 2) may determine if the lower 16 bits of the difference between the current candidate of constant and the read constant are 0 (step 528).

If the lower 16 bits of the difference between the current candidate of constant and the read constant are not 0 (step 528: NO), the system 200 (FIG. 2) may return the process to step 520 and repeat the series of processes until there is no more unexamined constant in the program code. On the other hand, if the determination result is YES in one of the steps 524, 526, and 528, the system 200 (FIG. 2) may mark the current constant as a constant that may be generated by one instruction by using the current candidate of constant (step 530). Then, the system 200 (FIG. 2) may return the process to step 520 and repeat the series of processes until there is no more unexamined constant in the program code.

It should be noted that the flow charts depicted in FIGS. 4, 5A, and 5B may describe processes executed on a system in which the instruction length is 32 bits.

Figure 6A:
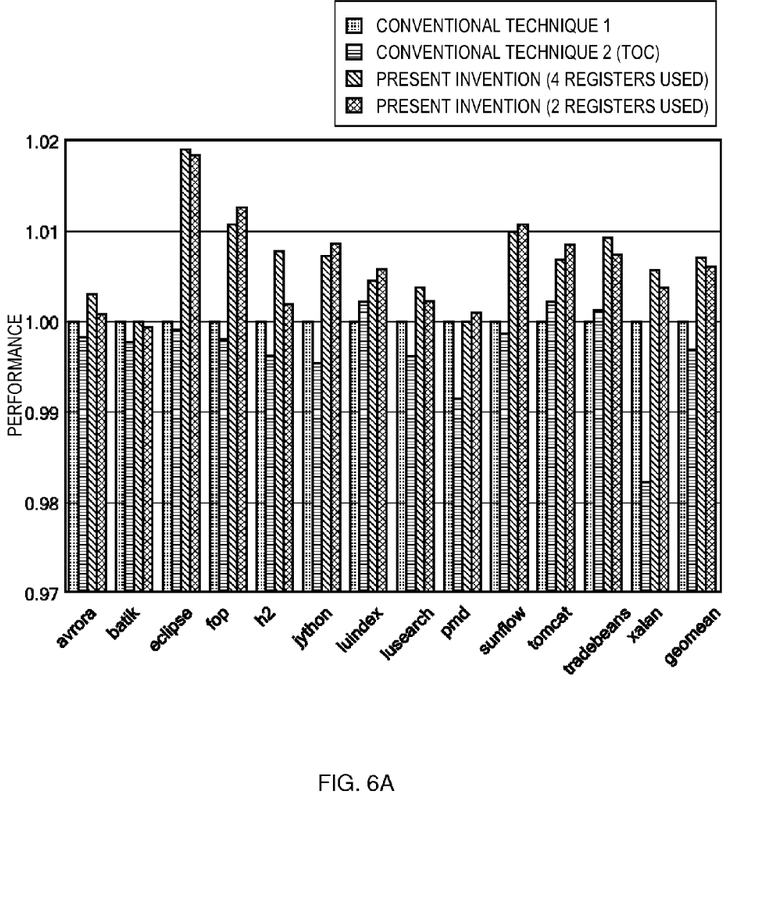
FIG. 6A is a diagram showing a comparison experiment result of performance obtained by applying the present disclosure and conventional methods to a trace-based Just-In-Time (JIT) compiler, according to an embodiment of the present disclosure.
Figure 6B:
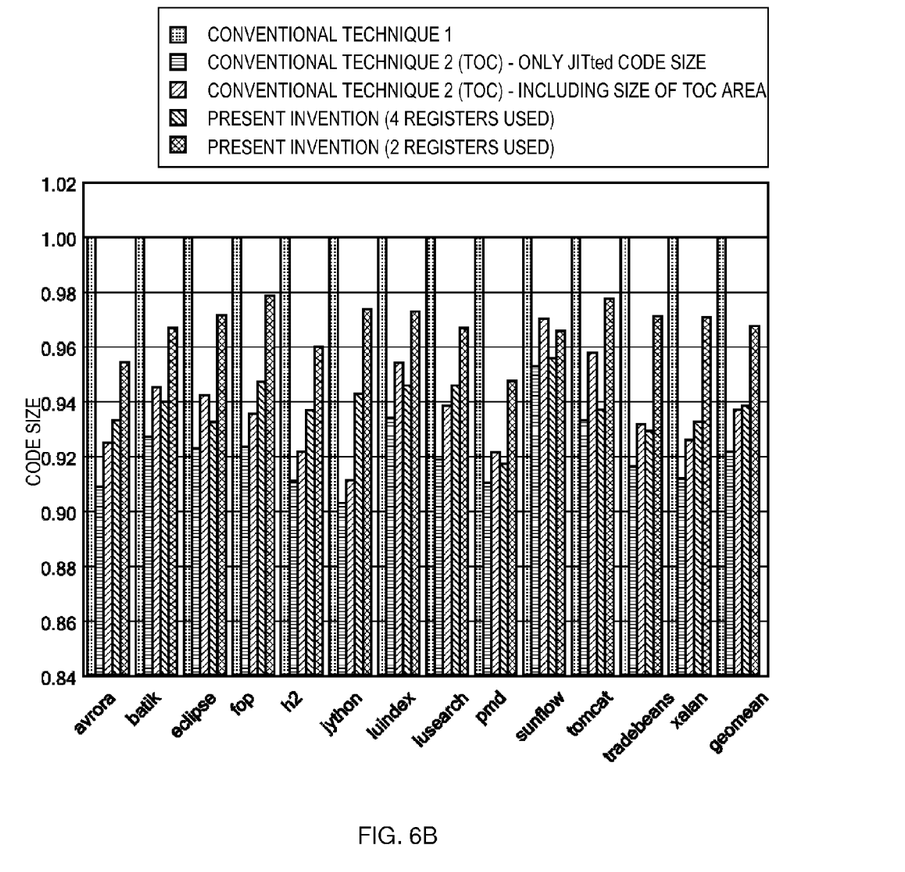
FIG. 6B is a diagram showing a comparison experiment result of code size obtained by applying the present disclosure and the conventional methods to the trace-based JIT compiler, according to an embodiment of the present disclosure.

Referring now to FIGS. 6A-6B, performance improvement and the effect of reducing the code size when the present disclosure is applied to a trace-based JIT compiler is described, according to an embodiment of the present disclosure. The processor device used in the experiment is provided with a POWER7™ processor operating at 3.0 GHz, and AIX7.1 is implemented as an operating system. The graphs shown in FIGS. 6A and 6B depict experimental results comparing the performance and the code size when: (1) a conventional technique 1 generates constants by means of two instructions, (2) a conventional technique 2 creates a TOC, and (3) the present disclosure is applied. It should be noted that when the present disclosure is applied, the experiment is performed for two cases, a case of allocating four constant registers and a case of allocating two constant registers. In FIG. 6A, the vertical axis denotes the performance based on the performance of the conventional technique 1, and the horizontal axis denotes program names of a DaCapo benchmark suite (Dacapo-9.12). In FIG. 6B, the vertical axis denotes the code size after the JIT compilation of the conventional technique 1, and the horizontal axis denotes the program names of the DaCapo benchmark suite as in FIG. 6A.

Compared to the conventional technique 1, the performance is improved by applying the present disclosure, and the code size is also reduced. On the other hand, compared to the conventional technique 2, although the code size is superior in the conventional technique 2, it may be stated that the performance is superior in the present disclosure. Furthermore, with the benchmark used in the experiment, there is no reduction in the performance caused by the reduction in the number of registers that may be used to allocate the constant registers. It should be noted that since the frequency of using constants in the trace-based JIT compiler is higher than that of a general method-based JIT compiler, it may be stated that the present disclosure is particularly suitable for the trace-based JIT compiler.

Although the present invention has been described by using the embodiment, the technical scope of the present invention is not limited to the scope described in the embodiment. It is apparent for those skilled in the art that the embodiment can be changed or improved in various ways. Accordingly, the modes obtained by changing or improving the embodiment are obviously included in the technical scope of the present invention.

It should be noted that the order of executing the processes, such as operations, procedures, steps, and stages in apparatuses, systems, programs, and methods illustrated in the present disclosure, may be achieved in an arbitrary order unless specifically stated "before", "prior to", or the like or unless output of a previous process is used in a subsequent process. Furthermore, it should be noted that even if output of a previous process is used in a subsequent process, another process may be included between the previous process and the subsequent process, and a change may be made to execute the previous process just before the subsequent process even if it is described that another process is included between the processes. Even if "First," "Next," "Subsequently," and the like are used for the convenience of the explanation of the present disclosure, this does not always mean that the implementation in this order is essential.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A method of reducing overhead in loading constants of a processor device, the method comprising the steps of:
   (a) preparing, by the processor device, one or more registers (hereinafter, called "constant registers") for loading constants;

(b) creating, by the processor device, a plurality of candidates of constants to be stored in the one or more constant registers based on constants used in a program code of a current compilation scope;

(c) estimating, by the processor device, an effect of the overhead reduction by generation of a constant used in the program code by using a candidate of constant, for each of the plurality of candidates of constants;

(d) determining, by the processor device, base constants to be loaded on the one or more constant registers based on the effect estimated for each of the plurality of candidates of constants; and (e) loading, by the processor device, for the program code, the base constants on the one or more constant registers at an entry point of the program code and using values of the constant registers to generate codes for generating constants used in the program code.

2. The method according to claim 1, wherein the plurality of candidates of constants include constants newly created based on the constants used in the program code.

3. The method according to claim 2, wherein the plurality of candidates of constants include the constants used in the program code, first values and second values obtained by adding predetermined values $V_1$ and $V_2$ ($V_2 > V_1$) to the constants, and third values obtained by setting lower n (n is a positive integer) bits of the constants, the first values, and the second values to 0.

4. The method according to claim 3, the step (b) further comprising:
a step of removing, by the processor device, constants that are generated by a least number of instructions from the plurality of candidates of constants.

5. The method according to claim 4, the step (b) further comprising:
a step of including, by the processor device, a value 0 in the plurality of candidates of constants.

6. The method according to claim 2, wherein the step (c) comprises the steps of:
counting, by the processor device, the number of uses of each constant used in the program code; and calculating by the processor device a score indicating the effect in relation to the candidate of each constant, and the step of calculating the score in relation to the candidate of each constant comprises a step of using the counted number of uses to calculate the number of instructions that are reduced by generation of a constant used in the program code by using the candidate of constant.

7. The method according to claim 6, wherein the number of uses of each constant is a number indicating the number of points that the constant is used in the program code.

8. The method according to claim 6, wherein the number of uses of each constant is the number of times that the constant is loaded during execution of the program code.

9. The method according to claim 1, wherein the processor device executes the method after an optimization process in a compilation process.

10. The method according to claim 1, wherein the step (d) comprises a step of extracting, by the processor device, the candidates of constants by an amount equal to the number of constant registers in descending order of the effect, on the condition that the estimated effect exceeds a predetermined threshold, and determining by the processor device the candidates as the base constants.

11. The method according to claim 1, further comprising the steps of, where the current compilation scope comprises a first method that invokes a second method:

executing the steps (b) and (c) for the constants used in the first method and the constants used in the second method to set the estimated effect as a first effect; and executing the steps (b) and (c) for all constants used in the first method and the second method to set the estimated effect as a second effect, wherein the step (d) determines the base constants based on the second effect on the condition that the second effect is greater than the first effect, and the step (e) comprises a step of generating codes for loading the base constants on the one or more constant registers at an entry point of the first method and maintaining the values of the constant registers at an entry point of the second method.

12. A computer program product for reducing overhead in loading constants, the computer program product comprising:
a computer readable non-transitory article of manufacture tangibly embodying computer readable instructions which, when executed, cause a computer to carry out the steps of a method for reducing overhead in loading constants, the method comprising:

(a) preparing one or more registers (hereinafter, called "constant registers") for loading constants;

(b) creating a plurality of candidates of constants to be stored in the one or more constant registers based on constants used in a program code of a current compilation scope;

(c) estimating an effect of the overhead reduction by generation of a constant used in the program code by using a candidate of constant, for each of the plurality of candidates of constants;

(d) determining base constants to be loaded on the one or more constant registers based on the effect estimated for each of the plurality of candidates of constants; and (e) loading, for the program code, the base constants on the one or more constant registers at an entry point of the program code and using values of the constant registers to generate codes for generating constants used in the program code.

13. The computer program according to claim 12, wherein the plurality of candidates of constants include constants newly created based on the constants used in the program code.

14. The computer program according to claim 13, wherein the plurality of candidates of constants include the constants used in the program code, first values and second values obtained by adding predetermined values $V_1$ and $V_2$ ($V_2 > V_1$) to the constants, and third values obtained by setting lower n (n is a positive integer) bits of the constants, the first values, and the second values to 0.

15. The computer program according to claim 14, the step (b) further comprising:
a step of removing constants that are generated by a least number of instructions from the plurality of candidates of constants.

16. The computer program according to claim 15, the step (b) further comprising:
a step of including a value 0 in the plurality of candidates of constants.

17. An information processing system for reducing overhead in loading constants, the information processing system comprising:
a memory;
a processor communicatively coupled to the memory; and a feature selection module communicatively coupled to the memory and the processor, wherein the feature selection module is configured to perform the steps of a method comprising:
- (a) preparing one or more registers (hereinafter, called "constant registers") for loading constants;
- (b) creating a plurality of candidates of constants to be stored in the one or more constant registers based on constants used in a program code of a current compilation scope;
- (c) estimating an effect of the overhead reduction by generation of a constant used in the program code by using a candidate of constant, for each of the plurality of candidates of constants;
- (d) determining base constants to be loaded on the one or more constant registers based on the effect estimated for each of the plurality of candidates of constants; and
- (e) loading, for the program code, the base constants on the one or more constant registers at an entry point of the program code and using values of the constant registers to generate codes for generating constants used in the program code.

18. The information processing system according to claim 17, wherein the plurality of candidates of constants include constants newly created based on the constants used in the program code.

19. The information processing system according to claim 18, wherein the plurality of candidates of constants include the constants used in the program code, first values and second values obtained by adding predetermined values $V_1$ and $V_2$ ($V_2 > V_1$) to the constants, and third values obtained by setting lower n (n is a positive integer) bits of the constants, the first values, and the second values to 0.

20. The information processing system according to claim 19, the step (b) further comprising:
- a step of removing constants that are generated by a least number of instructions from the plurality of candidates of constants.

* * * * *